United States Patent Office 3,205,174
Patented Sept. 7, 1965

3,205,174
NUCLEAR FUEL MATERIALS INCLUDING VITREOUS PHASE
Christopher Cameron Hope Wheatley and Dennis George, Didcot, Henry Lloyd, Wantage, and Jack Williams, Abingdon, England, assignors to United Kingdom Atomic Energy Authority, London, England
No Drawing. Filed May 21, 1959, Ser. No. 814,678
Claims priority, application Great Britain, May 30, 1958, 17,448/58
7 Claims. (Cl. 252—301.1)

The invention relates to nuclear fuel materials suitable for use in nuclear reactor fuel elements.

More particularly it relates to ceramic materials comprising an oxide of a fissile or fertile element dispersed in one or more oxides of non-fissile elements.

It has previously been proposed to use as such materials mixtures of the oxide of the fissile or fertile element with a refractory oxide of an element of low neutron absorption cross-section, such as magnesia or alumina. Sintered compacts of such mixtures have, however, the undesirable property of permeability at high temperatures (e.g., 800° C.) to the gaseous fission products evolved during the fission process.

We have now discovered that a high density ceramic formed from a mixture of an oxide of a fissile or fertile element and a refractory oxide such as alumina, together with one or more additional oxides which cause the formation of a liquid phase during sintering, has a very low permeability to fission product gases at high temperature. In particular the addition of small quantities of silica, together with basic oxides such as magnesium or calcium oxides, has this desired effect, the result of which is to form a vitreous phase enveloping the particles of fissile or fertile oxide present in the ceramic.

According to the present invention, therefore, a ceramic nuclear fuel material comprises particles of at least one oxide of a metal selected from the group consisting of fissile and fertile metals and particles of at least one refractory oxide of an element of low neutron absorption cross-section, is characterised in that said particles are substantially uniformly dispersed in a vitreous material of high melting point.

One suitable refractory oxide of an element of low neutron cross-section is alumina. Others include magnesia, beryllia and hafnium-free zirconia.

One suitable vitreous material of high-melting point is a glass formed from alumina, silica and one or more basic oxides such as lime or magnesia. A dispersion of alumina particles in a vitreous material of this kind is known as an aluminous porcelain or a vitrified aluminous ceramic.

Aluminous porcelain is a material which is particularly suitable as a constituent of a ceramic nuclear fuel material since it has a low neutron absorption cross-section when made from pure starting materials. By suitable choice of the constituents of the vitreous phase and their proportions it can be made stable at temperatures of at least 1000° C. in an inert atmosphere (e.g., of nitrogen or helium) for long periods. It has good mechanical strength, it can be made substantially homogeneous in composition and it can be fabricated to fine dimensional tolerances. We have found that a fissile or fertile oxide can be introduced into such a material, to form a ceramic nuclear fuel material, without loss of any of these advantageous properties, and with the added advantage of substantially complete impermeability to fission products products generated under neutron irradiation at temperatures of up to at least 800° C.

Thus, also according to the invention, a novel ceramic nuclear fuel material comprises particles of at least one oxide of a metal selected from the group consisting of fissile and fertile metals, dispersed in the vitreous phase of a pure aluminous porcelain.

In order to achieve long-term stability at 1000° C., it is necessary that the melting point of the vitreous phase should be considerably higher than 1000° C. and preferably at least 1500° C. In an aluminous porcelain this is achieved by adjusting the proportions of alumina, silica and basic oxide or oxides, in the manner well known in the art. For practical purposes, however, the melting point of the vitreous phase should not be higher than necessary, since this determines the sintering temperature for maximum density. We have found that compositions having proportions of alumina:silica:magnesia in the ratio of about 70:18:12 by weight, and those having proportions of alumina:silica:magnesia:lime in the ratio of about 87:10:2:1 by weight, produce a vitreous phase melting at about 1500° C., and therefore have an optimum sintering temperature of 1500° C. also.

In order to produce the ceramic nuclear fuel materials of the invention, the fissile and/or fertile oxide may be uniformly mixed with the refractory oxide and other ingredients, all in powder form, cold-pressed, and then sintered at a suitable temperature for maximum density. The mixed oxides are preferably mixed with a small quantity of an organic binding agent prior to cold-pressing. During subsequent sintering the binding agent is decomposed and volatilised. It may also be desirable to form a sintered pre-mix of some of the ingredients which produce the vitreous phase, in order to control more easily the sintering of the final composition, which otherwise might undergo very rapid sintering over a very small temperature range. Sintering below this range would not give the maximum density, while sintering above this range would give rise to expansion, leading to sticking together of compacts or to the formation of blisters. The incorporation of a sintered pre-mix into the final composition can extend its sintering range and therefore make control of sintering more easy.

Sintering should be carried out in a suitable atmosphere, which in the case of compositions containing uranium dioxide should be an inert or reducing atmosphere, e.g., nitrogen, hydrogen, or mixtures of these such as cracked ammonia.

The nature of the invention and the method by which it is to be performed will be more readily apparent from the following examples, in which methods of producing preferred compositions in accordance with the invention are described.

*Example I*

An intimate mixture of the following oxides in the form of fine powders was cold-pressed at 20 tons/sq. in. (316 kg./sq. cm.) and then sintered at 1500°±2° C. in nitrogen to form a disc about 1 inch (25 mm.) in diameter and 0.1 inch (2.5 mm.) thick.

| | Percent by weight |
|---|---|
| Uranium dioxide | 30.6 |
| Alumina | 48.6 |
| Silica | 12.5 |
| Magnesia | 8.3 |

During sintering a liquid phase was formed from the silica, magnesia and part of the alumina, which on cooling formed a vitreous phase surrounding particles of uranium dioxide and alumina.

*Example II*

An intimate mixture of the following oxides in the form of fine powders was cold pressed at 20 tons/sq. in. (316 kg./sq. cm.) and then sintered at 1600° C. in hydrogen for two hours to form a disc about 1 inch (25 mm.) in diameter and 0.1 inch (2.5 mm.) thick.

|  | Percent by weight |
|---|---|
| Uranium dioxide, $UO_2$ (average particle size 0.1 micron) | 30.9 |
| Alumina, $Al_2O_3$ | 60.0 |
| Silica, $SiO_2$ | 7.1 |
| Magnesia, MgO | 1.3 |
| Calcium oxide, CaO | 0.7 |

During sintering a liquid phase was present and a sintered compact was formed which had a density of 4.25 gm./cc. and an open porosity of less than 0.1%. Microscopic examination showed particles of $UO_2$ and alumina dispersed in a vitreous phase and each particle of $UO_2$ surrounded by vitreous material.

The following example shows the advantage of using a pre-mix of part of the ingredients forming the vitreous phase of the eventual product.

*Example III*

A pre-mix having the following composition was made up from fine powders:

|  | Percent by weight |
|---|---|
| Alumina | 6.9 |
| Silica | 6.3 |
| Magnesia | 1.17 |
| Calcium oxide | 0.58 |
| Total | 14.95 |

This mixture was heated in a furnace at 1200° C. for 2 hours to form a sintered mass, and then ground down to a fine powder again and mixed with the finely powdered other ingredients in the following proportions:

|  | Percent by weight |
|---|---|
| Uranium dioxide | 38.2 |
| Alumina | 46.85 |
| Pre-mix (as above) | 14.95 |

The mixed powders were then mixed with a binder material consisting of polybutyl methacrylate with a small proportion of dibutyl phthalate as plasticiser, in acetone as solvent, at the rate of 20 ml. of binder material to each 100 gm. of mixed powders, together with sufficient additional acetone to give a stiff plastic mix. This was granulated by passage through a coarse sieve and dried in an oven at 60° C. to evaporate the acetone. The mix was then cold-pressed in an automatic hydraulic press to produce a large number of pellets 1.23 inches (31 mm.) in diameter and 0.063 inch (1.6 mm.) thick. These pellets were then stacked 10 high and passed continuously through an electrical furnace, in an atmosphere of cracked ammonia, i.e., 25% hydrogen and 75% nitrogen by volume. The temperature of the furnace was so arranged that by passing through it the pellets reached the optimum sintering temperature in 5 hours and then remained at this temperature for 1 hour. The optimum sintering temperature was determined experimentally before sintering the whole number of pellets, and was found to vary somewhat according to the batch of uranium dioxide which had been used, varying from 1460° C. to 1555° C. For each batch, however, it was found that variation of the temperature of sintering by 20° C. either way still produced dense compacts with less than 1% open porosity and no tendency to blistering or sticking. The sintered pellets had a diameter of 1.12 inches (28.5 mm.) with a tolerance of +1% and −½%, and were 0.068 inch (1.7 mm.) thick with a tolerance of ±7%. The average weight of a pellet was 4.50 gm. and its composition was as follows:

|  | Percent by weight |
|---|---|
| $UO_2$ | 38.2 |
| $Al_2O_3$ | 53.75 |
| $SiO_2$ | 6.3 |
| MgO | 1.17 |
| CaO | 0.58 |

All the ingredients used were of high purity, and the neutron absorption cross-section of the composition (excluding the $UO_2$) was found to be 0.26 sq. mm./gm.

Samples prepared as in Example II were irradiated in the British nuclear reactor known as B.E.P.O. The rate of emission of the radioactive gaseous isotopes $Xe_{135}$ and $Kr_{85m}$ was measured and compared with the theoretical rate of formation of these isotopes and also the theoretical rate of emission of these isotopes by recoil from within 8 microns of the free surface of the samples, at the position in which they were irradiated. The results are shown in the following table in which is also shown for comparison the corresponding rates for a compact of 28.9% uranium dioxide and 71.1% magnesia produced by a similar procedure.

|  | $UO_2$—MgO | | | | | Composition of Example II | | | | |
|---|---|---|---|---|---|---|---|---|---|---|
| Temperature of irradiation (° C.) | 485 | 619 | 698 | 765 | 818 | 492 | 596 | 691 | 738 | 815 |
| $Xe_{135}$ rate of emission | 25 | 55 | 127 | 536 | 904 | 0.17 | 0.17 | 0.22 | 0.22 | 0.29 |
| $Kr_{85m}$ rate of emission | 1.6 | 6.4 | 21 | 111 | 214 | 0.08 | 0.10 | 0.14 | 0.18 | 0.28 |

All the rates are expressed in units of $10^6$ atoms per second. The theoretical rates of formation of $Xe_{135}$ and $Kr_{85m}$ in the $UO_2$=MgO composition were 920 and 222, respectively, and in the composition of Example II were 669 and 162 respectively. The theoretical recoil rate of $Xe_{135}$ from within 8 microns of the surface of either composition is 1.07, while that of $Kr_{85m}$ is 0.26.

It is apparent from this table, that the permeability to fission product gases of the composition prepared as in Example II is very low at all temperatures up to 815° C. The emission of such gases is a very low proportion of the amount of such gases which are being formed in the composition, and can be accounted for entirely by recoil of atoms of these gases from fissioning uranium atoms near the surface of the composition.

In contrast, the emission of fission product gases from the uranium dioxide-magnesia compact is large and increases rapidly as the temperature rises, until at about 800° C. it approaches the rate at which these gases are being formed in the compact.

The composition prepared as in Example III was also tested in B.E.P.O. and results very similar to those obtained for the composition of Example II were found.

We claim:

1. A ceramic nuclear fuel material consisting of particles of at least one oxide of a metal selected from the group consisting of fissile and fertile metals dispersed in the vitreous phase of a pure aluminous porcelain consisting of alumina, silica and magnesia in the proportions of about 70:18:12 by weight respectively.

2. A ceramic nuclear fuel material consisting of particles of at least one oxide of a metal selected from the group consisting of fissile and fertile metals dispersed in the vitreous phase of a pure aluminous porcelain consisting of alumina, silica, magnesia and lime in the proportions of about 87:10:2:1 by weight respectively.

3. A fission product-retaining ceramic nuclear fuel material consisting of particles of uranium dioxide and alumina dispersed in a high melting point glass formed from alumina, silica and at least one oxide selected from the group consisting of lime and magnesia.

4. A ceramic nuclear fuel material consisting of particles of uranium dioxide and alumina dispersed in a high melting point glass formed of alumina, silica and magnesia and consisting of uranium dioxide, alumina, silica and magnesia in the proportions of 30.6:48.6:12.5:8.3 by weight respectively.

5. A ceramic nuclear fuel material consisting of particles of uranium dioxide and alumina dispersed in a high melting point glass formed of alumina, silica, magnesia and lime and consisting of uranium dioxide, alumina, silica, magnesia and lime in the proportions of 30.9:60:7.1:1.3:0.7 by weight respectively.

6. A ceramic nuclear fuel material consisting of particles of uranium dioxide and alumina dispersed in a high melting point glass formed of alumina, silica, magnesia and lime and consisting of uranium dioxide, alumina, silica, magnesia and lime in the proportions of 38.2:53.75:6.3:1.17:0.58.

7. A fission product-retaining massive nuclear fuel material consisting of particles of alumina and particles of at least one oxide of a metal selected from the group consisting of fissile and fertile metals, all said particles being substantially uniformly dispersed in a solid phase formed by a glass of melting point above 1000° C., said glass being formed of alumina, silica and at least one oxide selected from the group consisting of lime and magnesia.

References Cited by the Examiner
UNITED STATES PATENTS

| | | | |
|---|---|---|---|
| 2,199,856 | 5/40 | Patridge | 106—52 |
| 2,728,867 | 12/55 | Wilson | 176—68 X |
| 2,816,042 | 12/57 | Hamilton. | |
| 2,928,780 | 5/60 | Harteck | 176—10 |

FOREIGN PATENTS 788,284  12/57  Great Britain.

OTHER REFERENCES

Nucleonics, August 1957, pp. 94–98.

Second United Nations International Conference on the Peaceful Uses of Atomic Energy, vol. 7, pp. 544–547.

TID–7546 (Book 2), Fuel Elements Conference, March 1958, pp. 554–562.

CARL D. QUARFORTH, *Primary Examiner.*

LEON D. ROSDOL, ROGER L. CAMPBELL, OSCAR R. VERTIZ, *Examiners.*